(12) United States Patent
Marcelli

(10) Patent No.: US 7,237,667 B2
(45) Date of Patent: Jul. 3, 2007

(54) LOAD HANDLING PLATFORM PROVIDED WITH RETRACTABLE ROLLERS

(75) Inventor: Pierre Marcelli, Laveze (FR)

(73) Assignee: Rotobloc S.A.R.L., Pirey (FR)

( * ) Notice: Subject to any disclaimer, the term of this patent is extended or adjusted under 35 U.S.C. 154(b) by 17 days.

(21) Appl. No.: 10/532,144

(22) PCT Filed: Oct. 21, 2003

(86) PCT No.: PCT/FR03/03126

§ 371 (c)(1),
(2), (4) Date: Apr. 20, 2005

(87) PCT Pub. No.: WO2004/037687

PCT Pub. Date: May 6, 2004

(65) Prior Publication Data

US 2006/0054452 A1    Mar. 16, 2006

(30) Foreign Application Priority Data

Oct. 21, 2002 (FR) .................................. 02 13075

(51) Int. Cl.
*B65G 13/12* (2006.01)
(52) U.S. Cl. ................................. 193/35 SS
(58) Field of Classification Search ........... 193/35 SS; 414/535

See application file for complete search history.

(56) References Cited

U.S. PATENT DOCUMENTS 3,243,029 A    3/1966 Oliver
4,911,276 A *  3/1990 Leigh-Monstevens et al. .......................... 477/181
4,930,612 A    6/1990 Thorndyke
5,088,585 A *  2/1992 Lambert ................. 193/35 SS
5,915,515 A *  6/1999 Blair ...................... 193/35 SS

FOREIGN PATENT DOCUMENTS

EP         0 547 268 A    6/1993

* cited by examiner

*Primary Examiner*—Mark A. Deuble
(74) *Attorney, Agent, or Firm*—Davis Bujold & Daniels, P.L.L.C.

(57) ABSTRACT

The invention concerns a roller track device based on simple kinematics, enabling reduction of the number of parts and production costs of the assembly as well as its space requirement, and designed for being fitted on new handling apparatuses as well as for retrofitting. The invention also concerns a platform or fork handling apparatus equipped with such a device. The roller track device (10) comprises a substantially horizontal table (21) whereon are mounted ball sockets (23), with a rack (31) mounted on top provided with openings (32) arranged opposite the balls (23). The rack (31) is mobile relative to the table (21) between a high position wherein it conceals the balls (23). A handle (41) coupled to the rack (31) enable its displacement in horizontal translation (Th). The openings (32) provided in the rack (31) consist of elliptical slots, which in combination with the spherical profiles of the underlying roller track device in the form of a platform with balls is also applicable to caster track platforms. The invention is useful for transferring heavy loads in a substantially horizontal plane with a platform handling apparatus for machine-tools, presses, injection machines and the like.

11 Claims, 2 Drawing Sheets

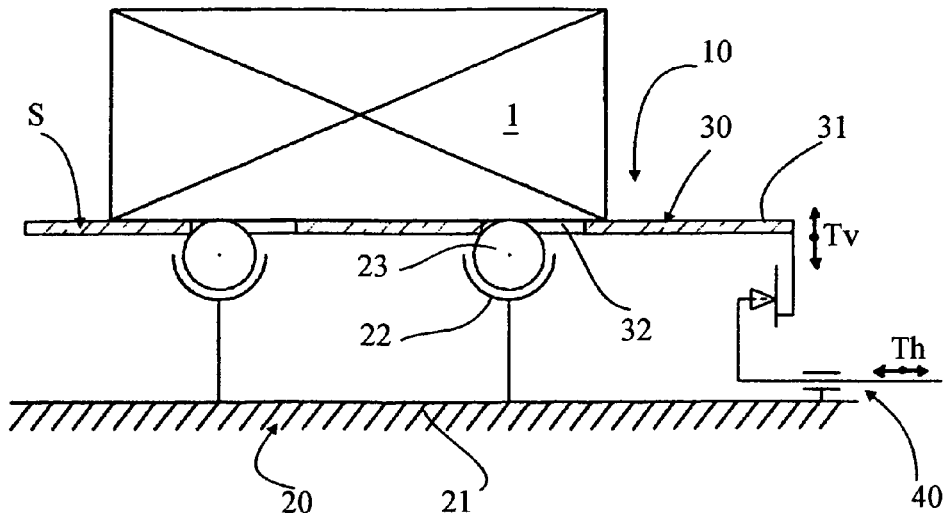
FIG. 3
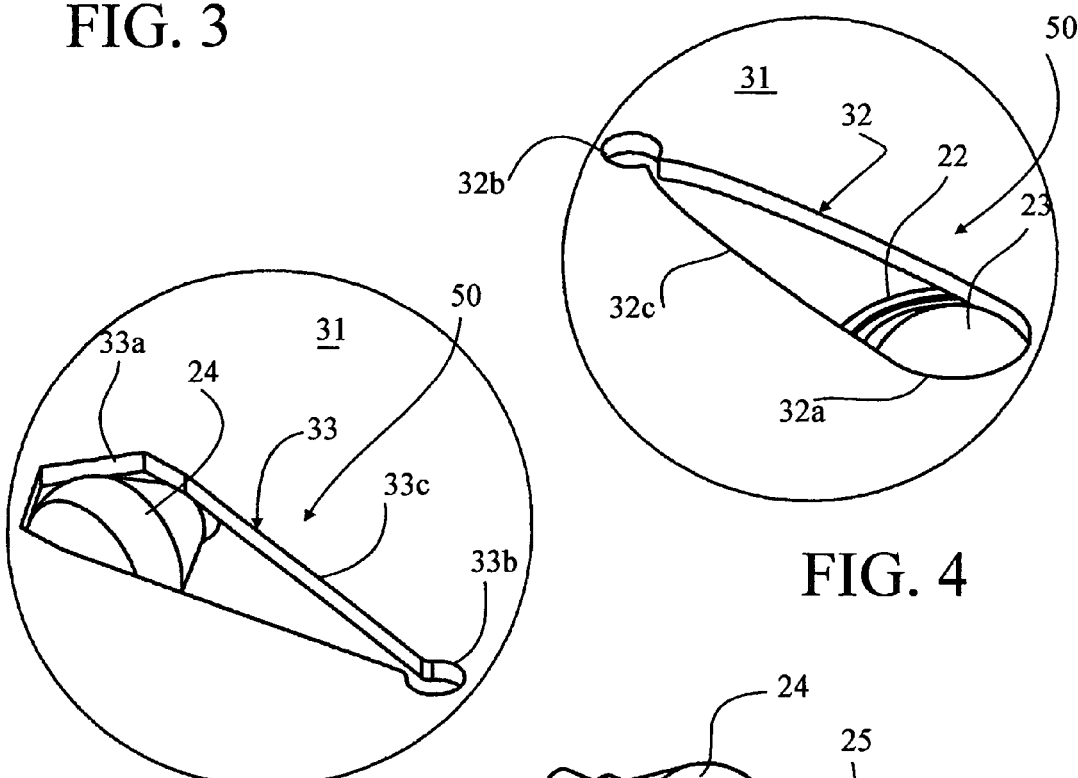
FIG. 4
FIG. 5A
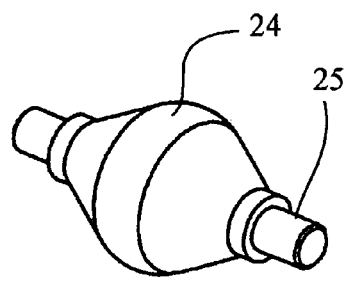
FIG. 5B

LOAD HANDLING PLATFORM PROVIDED WITH RETRACTABLE ROLLERS

This application is a national stage completion of PCT/FR2003/003126 filed Oct. 21, 2003 which claims priority from French Application Serial No. 02/13075 filed Oct. 21, 2002.

FIELD OF THE INVENTION

The present invention concerns a roller device for moving a load in an essentially horizontal plane and a handling apparatus equipped with such a roller device.

In industry, load handling platforms such as elevator cars and stacking equipment, for example, are currently used to handle heavy loads. These heavy loads might consist of tools for machine tools or presses used to cut or stamp metal, or molds or forms used in the injection of synthetic material, etc. Generally, loads of less than two tons are transported on load handling platforms, while loads from two to ten tons are transported using fork apparatuses. Loads of over ten tons are transported by cranes.

To facilitate the transfer of loads in the horizontal plane from the handling platform to the machine tool or vice versa, handling equipment now in use is provided with a roller device integral with the forks, designed to support the load and displace it without friction on the free roller devices. This handling equipment may also be provided with articulated arms designed to push or pull the load. The roller device generally comprises a "roller support structure" surmounted by a "load support structure." The function of the load support structure is to support the load while the handling apparatus moves, whereas the function of the roller support structure is to support it without friction in order to effect the transfer. Passing the load from one structure to the other and vice versa is accomplished through the displacement of one structure relative to the other so that the roller devices on the roller-support structure can be retracted or extended relative to the load support structure, said relative displacement being controlled by means of manual or automatic actuators.

In fork type handling apparatuses, this relative movement is generally controlled manually using a handle or a lever to activate rotation of the specific mechanisms such as, for example, cams or bearing systems.

BACKGROUND OF THE INVENTION

The mechanisms currently used in roller devices to ensure passage of the load from the "load support structure" to the "roller support structure" and vice versa present numerous drawbacks linked to their complexity, price, and space requirements. Moreover, certain mechanisms require a broad amplitude of movement, increasing the time required for transferring the load. Moreover, these mechanisms are not adapted for use with load handling devices already in service.

SUMMARY OF THE INVENTION

The present invention proposes remedying these disadvantages with a roller device based on simple kinematics, reducing the number of pieces, the cost of the unit, and its size, which can be used either with new load handling devices or to retrofit existing ones.

To achieve this, the invention concerns a roller device of the type indicated in the preamble, characterized in that it comprises at least one essentially horizontal table to which the roller elements are attached, at least one rack covering said table which has openings located opposite the roller devices, said rack defining a plane contact surface capable of carrying said load when it is static and said roller means being located in a plane that is essentially parallel to said surface and capable of carrying said load when it is moving, actuating means connected to at least one of these structures so as to make it movable relative to the other between at least a lowered position and a raised position, wherein the load is supported either by the rack or by the table, in that said actuating means are designed to displace the structure called the movable structure at least in horizontal translation and in that said rack comprises lifting means designed to cooperate with said roller elements on said table so as to cause vertical displacement of the structure called the movable structure simultaneously with its horizontal displacement.

The elevating means are advantageously shaped so as to be compatible with the roller elements and form lifting ramps.

In a preferred embodiment, the openings consist of orifices defining at least a first zone designed to allow at least the tops of the roller elements to project through, a second zone designed to cover the roller elements, and an intermediate zone which forms, in combination with the roller elements, said lifting ramps. The second zone with openings may be designed to block the roller elements in said rack openings in order to lock the position of the rack in relation to the table.

The roller devices may be spherical balls or bi-conical rollers, while the intermediate zone with openings would then be essentially elliptical or triangular in shape and converging toward the second zone. The first and second zones with openings may have a transverse dimension ranging respectively from 60 to 95% and from 10 to 45% of the diameter of the roller element.

Preferably the rack is movable in relation to the table supporting the roller elements, which is fixed, said rack being connected to the actuating means.

In this embodiment, the actuating means comprises at least one handle movable in translation inside a guide block integral with the table and oriented in an essentially perpendicular direction to the horizontal displacement of the rack, said rack comprising a guide groove traversed by the handle and angularly offset in relation to the guide block so as to generate horizontal displacement of the rack. These actuating means may comprise at least one locking device for attaching the rack to the table in at least one of its raised or lowered positions.

For the same purpose, the invention concerns a load handling platform of the type indicated in the preamble, characterized in that it comprises at least one roller device as defined above.

BRIEF DESCRIPTION OF THE DRAWINGS

The advantages of the present invention will be more apparent from the following description of several embodiments cited by way of non-limiting example, with reference to the attached drawings, wherein:

FIG. 3 is a functional schema of the device of FIG. 1;

FIG. 4 is a detailed view of a roller device cooperating with a light on the device of FIG. 1;

FIG. 5A is a view of a variation similar to FIG. 4 and FIG. 5B illustrates the corresponding roller element.

DETAILED DESCRIPTION OF THE INVENTION

Figure 1:
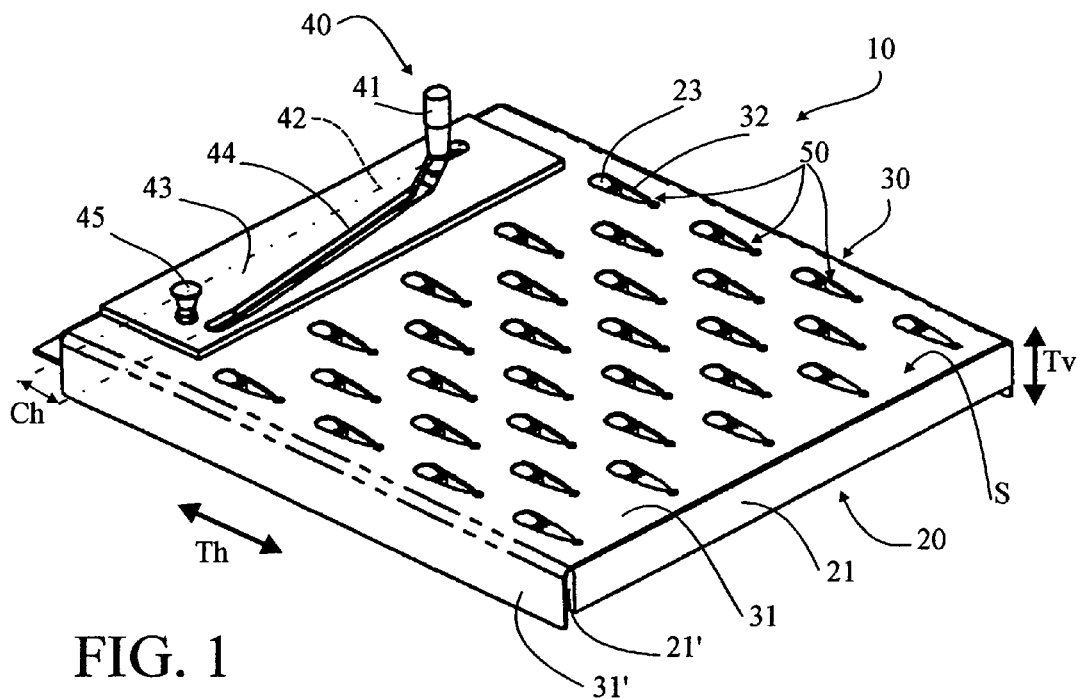
FIG. 1 is a perspective of a roller device according to the invention in the form of a platform.
Figure 2:
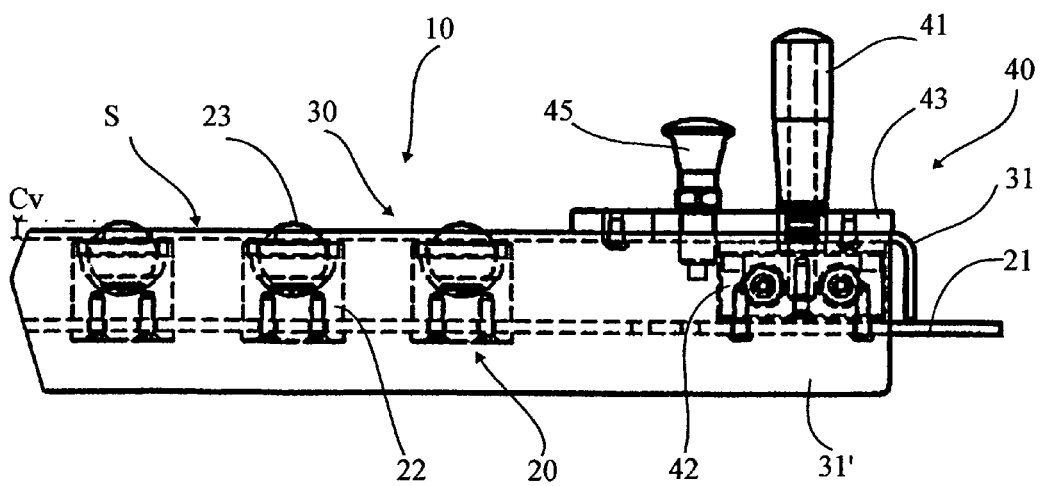
FIG. 2 is a partial side view of the device of FIG. 1.

With reference to the drawings, roller device 10 according to the invention is formed like a platform and is designed to equip a conventional platform load handling apparatus (not shown). It ensures two functions: static maintenance with friction of heavy loads 1 weighing up to about two tons while the load handling device is moving, and dynamic maintenance of these loads 1 without friction while they are being transferred in a plane parallel to the platform. In certain applications, this roller device 10 can be used alone or in combination with other equipment.

This roller device 10 comprises a roller supporting structure 20 consisting of roller elements 23 surmounted by a load supporting structure 30 having one plane contact surface S provided with openings 32 that allow at least the tops of roller elements 23 to be visible. In this exemplary embodiment, as shown schematically in FIG. 3, the load support structure 30 is movable relative to the fixed roller support structure 20 between two stable fixed positions: a raised position in which it covers roller elements 23, with load 1 in plane contact with surface S of the load support surface 30, and a lowered position in which it uncovers the tops of roller elements 23, with load 1 being in contact at some points with roller elements 23. Obviously, the reverse configuration is also possible, that is, the roller support structure 20 may be movable in relation to load support structure 30.

Load support structure 30 is associated with actuation means 40 for displacing it in horizontal translation Th on a course Ch and with lifting means 50 in order for displacing it in vertical translation Tv on a course Cv simultaneously with its horizontal displacement Th, path. Cv being shorter than path Ch. The originality of roller device 10 of the invention resides in the fact that lifting means 50 does not consist of costly, complex supplemental mechanisms, but rather, it is directly integrated within load support structure 30 and roller support structure 20. The fact that the vertical and horizontal displacements occur simultaneously is due to the moving contact between openings 32 in load support structure 30 and roller elements 23 in the roller support structure 20, said openings 32 and said roller elements 23 being shaped specifically to form a lifting ramp as described below.

In the example shown the roller-support structure 20 consists of a table 21 designed for use in the horizontal position, said table 21 being rectangular and supporting demi-cage pivot joints 22 receiving balls 23 to form axial pivots. These balls 23 constitute the roller elements on said roller device 10 and are uniformly distributed in the same plane, while the tops of balls 23 fall within a plane parallel to the plane contact surface S of load support structure 30. Table 21 is designed to either fit in the same place and position as the existing platform on a standard load handling platform or to be superimposed on it.

Load support structure 30 consists of a generally rectangular rack 31 superimposed on table 21 having longitudinal edges 31' bent at a right angle against edges 21' of table 21 to form longitudinal guides. Said rack 31 moves freely along said longitudinal guides in horizontal translation Th and in vertical translation Tv. It is associated with an actuation means 40 which is manual in the example shown and consists of a handle 41 located along an axis that is perpendicular to the surface of rack 31 and guided inside a guide block 42 with balls integral with table 21 and oriented perpendicular to Th. Rack 31 supports a plate 43 equipped with a guide groove 44 traversed by handle 41, said groove extending along guide block 42 between a first extremity located opposite said guide block 42 and a second extremity separated from said guide block 42 by a distance that corresponds to the path Ch followed by rack 31. The actuation means 40 also comprises a locking device 45 consisting of a button movable along an axis parallel to handle 41 and projecting below rack 31 so as to be encased within table 21 and prevent accidental displacement of rack 31. Obviously said actuation means 40 might consist of any other equivalent means such as, for example, a cylinder, a nut and bolt system, a ball and socket joint, a lever that is automatically activated when the load handling device approaches the machine tool destined to receive the load, or the like.

Openings 32 in rack 31 consist of generally elliptical orifices 32 distributed along the entire surface of rack 31 and located opposite balls 23. Therefore, there is an equal number of orifices 32 and balls 23. They are oriented parallel to the direction of horizontal displacement Th of rack 31 and extend for a length that is essentially equal to the path Ch of said rack 31. With reference to FIG. 4, each orifice 32 defines at least a first zone 32a designed to uncover the top of a ball 23, a second zone 32b designed to cover ball 23, and an intermediate zone 32c designed to form, together with ball 23, lifting means 50. The first zone 32a is formed of a semi-circle with a diameter ranging from, for example, 60 to 95% of the diameter of balls 23 so as to allow the tops of balls 23 to project beyond the surface of rack 31. The second zone 32b is formed of a nearly complete circle with a smaller diameter than that of first zone 32a and ranging for example from 10 to 45% of the diameter of balls 23 in order to cover and block them. This second zone 32b performs a complementary locking function, as the top of ball 23 remains trapped inside this zone. This security system blocks rack 31 in the upper position, while maneuvering handle 41 in the opposite direction causes it to return to the lower position. Intermediate zone 32c is generally elliptical and extends from first zone 32a to second zone 32b as it narrows. The two edges of this intermediate zone 32c are therefore slightly curved and converge so as to form, together with spherically shaped ball 23, a lifting ramp. The angle of inclination of both this lifting ramp and guide groove 44 are designed to reduce the force that must be applied to maneuver handle 41, which is approximately 20 kg to lift a one ton load.

The shape of orifices 32 and roller elements 23 may, of course, vary as a function of the weight of load 1. With heavier loads, for example, as shown in FIGS. 5A and 5B, bi-conical rollers 24 and generally triangular orifices 33 are used. Rollers 24 are integral with axles guided inside supports attached to table 21. These bi-conical rollers 24 have a partially spherical central portion and truncated sides with a shape that is compatible with the V-shaped edges of intermediate zone 33c of orifices 33. First and second zones 33a and 33b remain the same, while zone 33a may be semi-hexagonal in shape.

It is readily apparent that the concept of roller device 10 in accordance with the invention is based on simple kinematics, making it inexpensive to purchase and maintain, less cumbersome, and more durable.

The roller device 10 as described can be sold as a platform to retrofit load-handling apparatuses already in use, or integrated into new equipment. This is the reason that the invention also applies to load-handling apparatuses (not shown) equipped with such a roller device 10.

The present invention is not limited to the exemplary embodiments described, but extends to any modification and variation obvious to a person skilled in the art while remaining within the scope of protection defined by the attached claims.

The invention claimed is:

1. A roller device (10) for displacing a load (1) in an essentially horizontal plane comprising at least one essentially horizontal table (21) to which roller elements (23, 24) are attached, at least one rack (31) covering said table (21) equipped with openings (32, 33) located opposite said roller elements (23, 24), said rack (31) defining a plane contact surface (S) for supporting said load when the load is static and said roller elements (23, 24) being located in a plane essentially parallel to said surface (S) and able to support said load when the load is moving, an actuating means (40) being associated with at least one of the rack (31) and the table (21) to be movable relative to another of the rack (31) and the table (21) between at least a lower position and an upper position wherein the load is supported either by the rack (31) or by the table (21), said actuating means (40) displaces one of the rack (31) and the table (21) at least in a horizontal translation (Th), and said openings (32, 33) of the rack (31) have a shape compatible with a shape of the roller element (23, 24) to form lifting ramps so as to cause the one of the rack (31) and the table (21) to move in vertical displacement (Tv) simultaneously with the horizontal displacement (Th).

2. A load handling platform comprising at least one roller device (10) for displacing a load (1) in a generally horizontal plane comprising at least one generally horizontal table (21) to which roller elements (23,24) are attached, at least one rack (31) covering said table (21) having openings (32,33) located opposite said roller elements (23,24), said rack (31) defining a plane contact surface (S) capable of supporting said load when the load is static and said roller elements (23, 24) being located in a second plane generally parallel to said surface (S) and capable of supporting said load when moving, an actuating means (40) associated with at least one of the rack (31) and the table (21) to be movable in relation to another of the rack (31) and the table (21) between at least a lower position and an upper position, the load is supported by either the rack (31) or by the table (21), actuating means (40) displaces the rack (31) and the table (21) at least in a horizontal translation (Th), wherein said openings (32, 33) on rack (31) have a shape compatible with the shape of the roller elements (23) to form lifting ramps so as to generate a vertical displacement (Tv) by the rack (31) or the table (21) simultaneous with the horizontal displacement (Th).

3. The load handling platform according to claim 2, wherein the openings (32, 33) consist of orifices defining at least a first zone (32a, 33a) that allows at least tops of the roller elements (23, 24) to project, a second zone (32b, 33b) which covers the roller elements (23, 24), and an intermediate zone (32c, 33c) which forms, in combination with the roller elements (23, 24), said lifting ramps.

4. A roller device (10) for displacing a load (1) in substantially a horizontal plane comprising at least one substantially horizontal table (21) to which roller elements (23, 24) are attached, at least one rack (31) covering said table (21) equipped with openings (32, 33) located opposite said roller elements (23, 24), said rack (31) defining a plane contact surface (S) for supporting said load when the load is static and said roller elements (23, 24) being located In a plane substantially parallel to said surface (S) and able to support said load when the load is moving, an actuating mechanism (40) being associated with at least one of the rack (31) and the table (21) to be movable relative to another of the rack (31) and the table (21) between at least a lower position and an upper position:

wherein the load is supported either by the rack (31) or by the table (21), said actuating mechanism (40) displaces one of the rack (31) and the table (21) at least in a horizontal translation (Th), and said openings (32, 33) of the rack (31) have a shape compatible with a shape of the roller element (23, 24) to form lifting ramps so as to cause the one of the rack (31) and the table (21) to move in vertical displacement (Tv) simultaneously with the horizontal displacement (Th); and the openings (32, 33) consist of orifices defining at least a first zone (32a, 33a) which allows at least tops of the roller elements (23, 24) to project, a second zone (32b, 33b) for covering the roller elements (23, 24) and an intermediate zone (32c, 33c) which together with the roller elements (23, 24) forms lifting ramps.

5. The device according to claim 4, wherein the second zone (32b, 33b) with the openings is designed to block the roller elements (23, 24) in said openings (32, 33) on the rack (31) In order to look in a position of said rack (31) relative to said table (21).

6. The device according to claim 5, wherein the roller elements are spherical balls (23) and the intermediate zone (32c) with the openings (32) is generally elliptical in shape, converging toward the second zone (32b).

7. The device according to claims 6, wherein the first and second zones (32a, 33a, 32b, 33b) of the openings (32, 33) have transverse dimensions ranging respectively from 60 to 95% and from 10 to 45% of the diameter of the roller elements (23, 24).

8. The device according to claim 5, wherein the roller elements are bi-conical rollers (24) and the Intermediate zone (33c) with the openings (33) is generally triangular in shape, converging toward the second zone (33b).

9. The device according to claim 5, wherein the rack (31) is movable and associated with an actuation means (40) and the table (21) supporting the roller elements (23, 24) is fixed.

10. The device according to claim 9, wherein the actuating mechanism (40) comprises at least one handle (41) moving In translation within a guide block (42) integral with the table (21) and oriented In an essentially perpendicular direction to the direction of horizontal displacement (Th) by the rack (31), said rack (31) comprising a guide groove (44) traversed by said handle (41) and angularly offset in relation to the guide block (42) so as to generate horizontal displacement of the rack (31).

11. The device according to claim 10, wherein the actuating mechanism (40) comprises at least one locking element (45) for connecting the rack (31) to the table (21) in at least one raised or lowered position.

* * * * *